(12) United States Patent
Otto et al.

(10) Patent No.: US 8,627,893 B2
(45) Date of Patent: Jan. 14, 2014

(54) APPARATUS AND METHOD FOR SELECTIVE FLOW CONTROL

(75) Inventors: Alexander Otto, Niedersachsen (DE); Gunnar Bothmann, Niedersachsen (DE)

(73) Assignee: Baker Hughes Incorporated, Houston, TX (US)

(*) Notice: Subject to any disclaimer, the term of this patent is extended or adjusted under 35 U.S.C. 154(b) by 180 days.

(21) Appl. No.: 13/086,096

(22) Filed: Apr. 13, 2011

(65) Prior Publication Data
US 2011/0253240 A1 Oct. 20, 2011

Related U.S. Application Data

(60) Provisional application No. 61/324,061, filed on Apr. 14, 2010.

(51) Int. Cl.
*E21B 34/06* (2006.01)
(52) U.S. Cl.
USPC .......................... 166/373; 166/332.1; 166/386
(58) Field of Classification Search
USPC ....................... 166/332.1, 373, 386
See application file for complete search history.

(56) References Cited

U.S. PATENT DOCUMENTS

| | | | |
|---|---|---|---|
| 3,907,046 A | 9/1975 | Gaylord | |
| 4,214,629 A | 7/1980 | Upton | |
| 4,493,373 A | 1/1985 | Jackson | |
| 5,464,036 A | 11/1995 | Tomkins et al. | |
| 5,701,959 A | 12/1997 | Hushbeck et al. | |
| 5,901,749 A | 5/1999 | Watson | |
| 6,186,477 B1 | 2/2001 | McCombs et al. | |
| 6,279,875 B1* | 8/2001 | Chatufale | 251/174 |
| 6,554,074 B2 | 4/2003 | Longbottom | |
| 6,702,024 B2 | 3/2004 | Neugebauer | |
| 6,983,303 B2 | 1/2006 | Pellegrino et al. | |
| 7,073,590 B2 | 7/2006 | Neugebauer et al. | |
| 2003/0111227 A1 | 6/2003 | Neugebauer | |
| 2010/0095758 A1 | 4/2010 | Georgi et al. | |
| 2011/0198077 A1 | 8/2011 | Kischkat et al. | |

* cited by examiner

*Primary Examiner* — Nicole Coy
(74) *Attorney, Agent, or Firm* — Mossman, Kumar & Tyler PC

(57) ABSTRACT

A disk member selectively blocks flow across a fluid conduit formed in a body. The disk member may include a shaft having a longitudinal axis, a ring member disposed on the shaft, a sealing member disposed on the shaft, and a pressure applying surface in contact with the sealing member. The pressure applying surface may be non-orthogonal to the longitudinal axis.

17 Claims, 5 Drawing Sheets

US 8,627,893 B2

APPARATUS AND METHOD FOR SELECTIVE FLOW CONTROL

CROSS REFERENCE TO RELATED APPLICATIONS

This application claims priority from U.S. Provisional Patent Application Ser. No. 61/324,061, filed Apr. 14, 2010, the disclosure of which is incorporated herein by reference in its entirety.

FIELD OF THE DISCLOSURE

This disclosure pertains generally to flow control devices such as valve.

BACKGROUND OF THE DISCLOSURE

During the drilling and completion of oil and gas wells, the downhole environment can impose substantial operational stresses on downhole equipment. These harsh conditions include vibration and torque from the drill bit, exposure to drilling mud, drilled cuttings, and formation fluids, hydraulic forces of the circulating drilling mud, and scraping of sensitive equipment against the sides of the borehole. Extreme pressures and temperatures may also be present. Such harsh conditions can damage and degrade downhole equipment. Valves used in drilling operations may be susceptible to the harsh downhole conditions because they require the use of seals and moving parts. Valves that interact with the drilling mud flow may be susceptible to the drilling mud, the deleterious debris carried by the drilling mud, and significant pressure drops.

The present disclosure addresses the need for sealing high differential pressure in a downhole environment, as well as in surface applications.

SUMMARY OF THE DISCLOSURE

In aspects, the present disclosure provides an apparatus for controlling a fluid flow. The apparatus may include a body having a fluid conduit; and a disk member selectively blocking flow across the fluid conduit. The disk member may include a shaft having a longitudinal axis; a ring member disposed on the shaft; sealing member disposed on the shaft; and a pressure applying surface in contact with the sealing member. The pressure applying surface may be non-orthogonal to the longitudinal axis.

In aspects, the present disclosure also provides an apparatus for controlling a fluid flow. The apparatus may include a body having a fluid conduit formed of a first section and a second section; a rod configured to translate in the body, the rod having a flow passage in communication with the first fluid conduit section; a first and second sleeve members disposed in the body, each sleeve member having a bore in communication with the second fluid conduit section; and a disk member disposed in the rod and between the first and second sleeve members. The disk member may include a shaft having a longitudinal axis and a medial flange; a sealing member disposed on the shaft and on each side of the medial flange; a pressure applying surface in contact with each sealing member, wherein the pressure applying surfaces are non-orthogonal to the longitudinal axis; and a ring member disposed on each end of the shaft, each sealing member being positioned between an associated ring member and pressure applying surface.

In aspects, the present disclosure may include a method for controlling a fluid flow. The method may include moving a disk member to selectively block flow across a fluid conduit formed in a body. The disk member may include a shaft having a longitudinal axis; a ring member disposed on the shaft; a sealing member disposed on the shaft; and a pressure applying surface in contact with the sealing member, wherein the pressure applying surface is non-orthogonal to the longitudinal axis.

In aspects, the present disclosure provides devices, systems and method for enhanced control, operation, service life, reliability, and/or performance for flow control devices. The teachings may be applied to a variety of systems both in the oil and gas industry and elsewhere.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
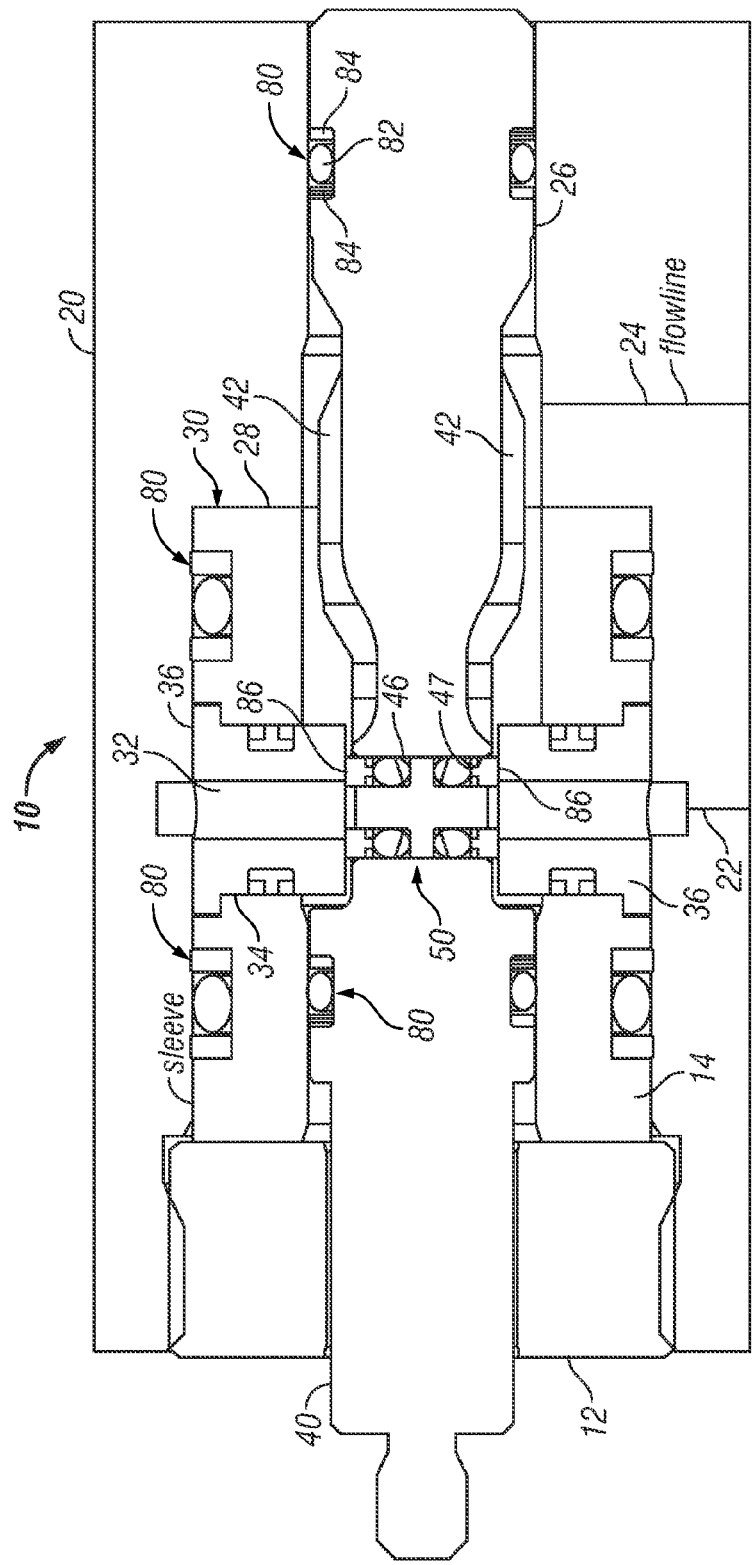
FIG. 1 shows a sectional view of a valve according to one embodiment of the present disclosure.
Figure 2:
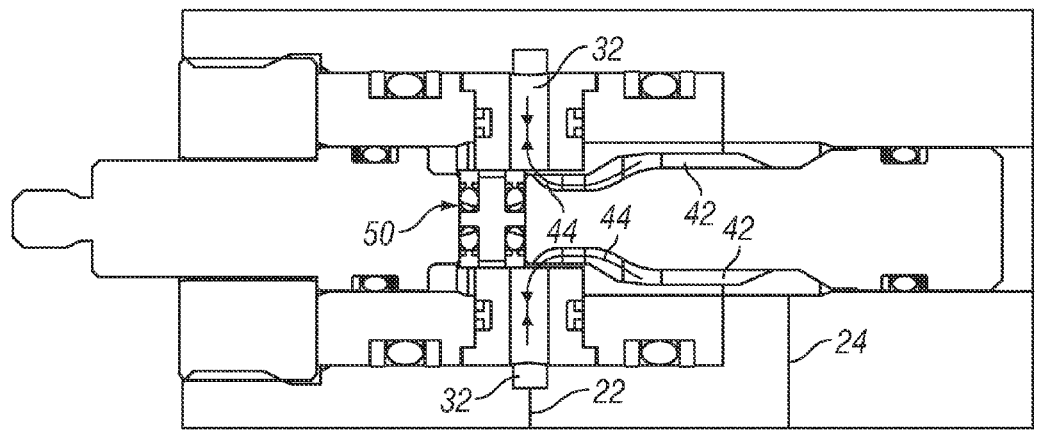
FIG. 2 shows the FIG. 1 embodiment valve where the disk member is in an open position.

Referring initially to FIGS. 1 and 2, there is shown a valve assembly 10 that may be used to provide bi-directional flow control. The valve assembly 10 may include a body or housing 20 in which a cage 30, a rod 40, and a disk member 50 are disposed. As will be described in greater detail below, the valve assembly 10 may be configured to control fluid flow across flow conduits 22 and 24.

In one embodiment, the disk member 50 selectively blocks fluid communication between a flow bore 32 in a cage 30 and flow passages 42 formed along the rod 40. In the embodiment shown, the flow bore 32 connects to flow conduit 22 and the flow passages 42 connect to flow conduit 24. In FIG. 1, the valve assembly 10 is shown in the closed position wherein the disk member 50 forms a barrier that blocks fluid communication between the flow bore 32 and the flow passages 42. In FIG. 2, the valve assembly 10 is shown in the open position wherein the disk member 50 has shifted to hydraulically connect the flow bore 32 and the flow passages 42. Exemplary flow paths are designated with numerals 44. It should be noted that the flow paths 44 are bidirectional.

As shown in FIG. 1, in one embodiment, the disk member 50 may be shifted between the open and the closed position with the rod 40. The rod 40 is positioned in and translates along a bore 26 of the housing. In one arrangement, the rod 40 is formed as a generally cylindrical member that has a transverse bore 46 for receiving the disk member 50. The rod 40 may have an outer surface on which the flow passages 42 are formed. That is, the flow passages 42 may be slots or reduced diameter portions that form gaps between the housing 20 and the rod 40 and cage 30 and the rod 40 through which fluid may pass. In some embodiments, flow passages may be formed as bores within the rod 40. The rod 40 may be supported in the housing 20 by the cage 30. In one embodiment, the cage 30 may be formed as a tubular or mandrel-like member that is received into a chamber 28 of the housing 20. The cage 30 may include a transverse bore 34 for receiving sleeves 36. The cage may be secured within the housing 20 with a retention member 12 and a securing member 14.

Figure 3:
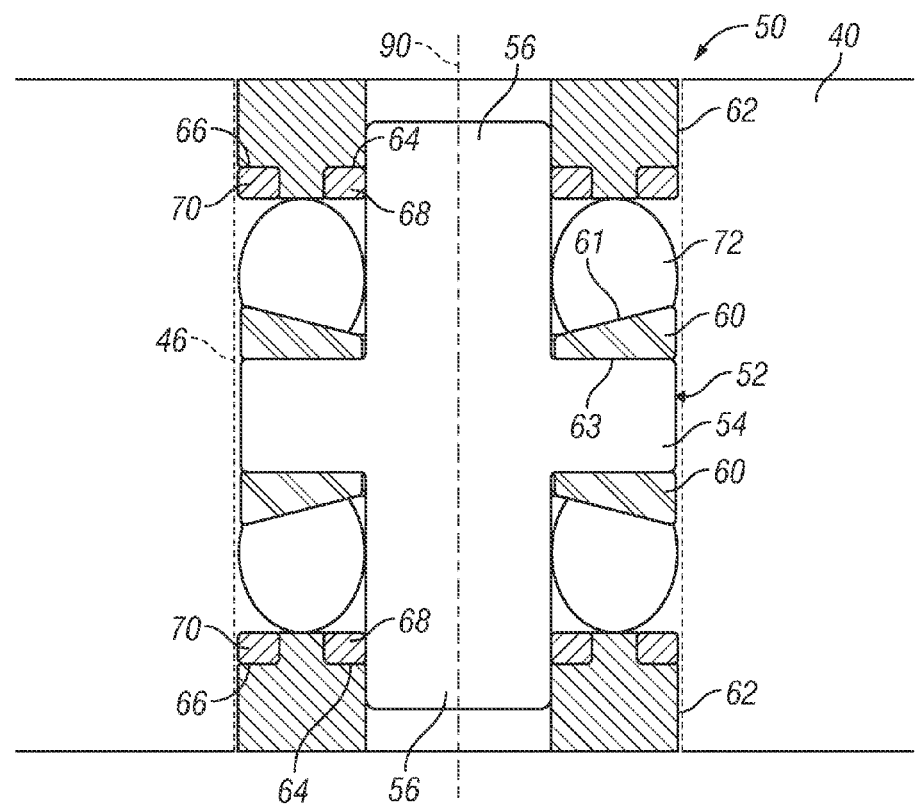
FIGS. 3-7 shows several embodiments of disk assemblies according to the present disclosure.

Referring now to FIG. 3, in one embodiment, the disk 30 may be formed as a member that is received into the transverse bore 46 of the rod 40. The disk member 50 may include a shaft 52 on which a medial flange 54 is formed. The shaft 52 has distal ends 56. Each distal end 56 is shaped to receive a first back-up ring 60 that seats against the flange 54 and a disk 62. The ring 60 may be formed as a member that is annular in shape. In one embodiment, the disk 62 may include inner and outer grooves 64, 66. Inner and outer back-up rings 68, 70 may be positioned in the inner and outer grooves 64, 66, respectively. A sealing element 72, such as an o-ring, may be disposed between the back-up ring 60 and the disk 62. Thus, each sealing member is positioned between an associated ring 60 and a pressure applying surface of the disk 62. While the sealing element 72 is shown as circular, it should be understood that the sealing element 72 may deform into a non-circular shape when compressed between the back-up ring 60 and the disk 62. The several components of the disk member 50 may be sized and shaped to minimize the gap between the disk member 50 and an inner surface 47 (FIG. 1) that defines the bore 46.

Referring now to FIG. 1, in certain embodiments, one or more surfaces of the valve 10 utilize feature and/or may be treated or formed with one or more materials that increase the ability of the valve 10 to confine fluid flow only along the flow paths 44 (FIG. 2). For example, seal assemblies 80 may be strategically disposed with the valve 10 to control fluid flow. An exemplary seal assembly 80 may include a sealing element 82, such as an o-ring or t-ring, that is positioned between two compression or back-up rings 84.

Additionally, mating surfaces along in the vicinity of the flow paths 44 may be treated or formed to enhance resistance to fluid invasion, increase resistance to wear, etc. For example, one or more of the outer surfaces of the sleeve 36 may include polycrystalline diamond (PCD), monocrystalline diamond, carbide, cemented carbide, tungsten carbide, hard metal, synthetics, plastic material, metal, monocrystalline aluminium oxide or similar materials. Also, one or more of the outer surfaces of the disks 62 may be formed of polycrystalline diamond (PCD), monocrystalline diamond, carbide, cemented carbide, tungsten carbide, hard metal, synthetics, plastic material, metal, monocrystalline aluminium oxide or similar materials. In certain embodiment, such surface treatments are provided on the mating surfaces of the contact 86 (FIG. 1) between the sleeve 36 and the disk 62.

Additionally, the disk member 50 of the present disclosure may be susceptible to numerous variants. As shown in FIGS. 3-7, various shapes and arrangements may be used for the back-up ring 60 and/or the shaft 52 to in order to compress the sealing member 72 with a pressure-applying surface that is not orthogonal to the longitudinal axis 90 of the shaft 52. As will become apparent, the back-up rings 60 that seat on the flange 54 (i.e., the interior back-up rings) and/or the flange 54 may use one or more contact surfaces that are non-orthogonal to the axis 90 of the shaft 52. Moreover, either the interior back-up rings 60 or the flange 54 may be omitted for a particular arrangement. In embodiments, the rod 40 shifts or reciprocates the disk 50 transverse to the longitudinal axis 90.

In FIG. 3, the back-up ring 60 may be formed in a non-rectangular shape: e.g., a quadrangular shape. For example, the pressure applying surface 61 may be non-parallel to an opposing surface 63 and the flange 54 uses a rectangular in cross-sectional shape.

Figure 4:
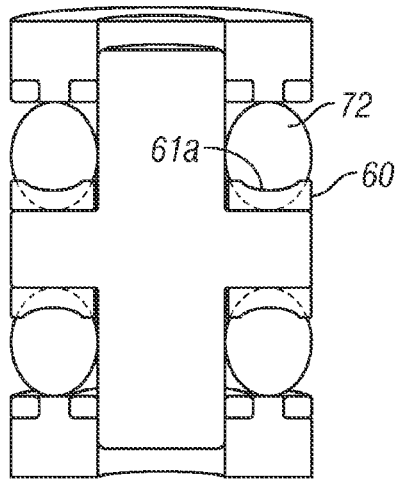

In FIG. 4, the back-up ring 60 uses a somewhat rectangular shape, but the pressure applying surface 61a is arcuate or concave. The surface 61a may have a contour that is complementary to the sealing element 72, or have a different contour. Also, in other embodiments, the surface 61 may be convex and may include an inflection point (e.g., a convex portion and a straight portion).

Figure 5:
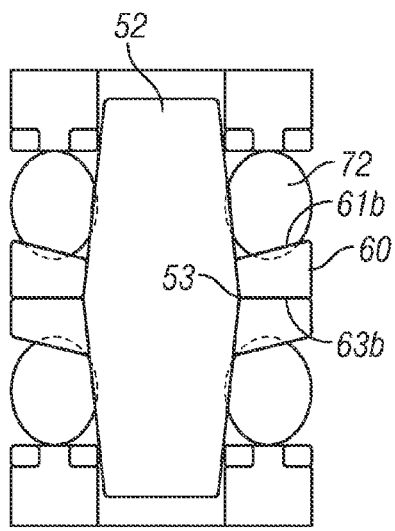

In FIG. 5, the back-up ring 60 may be formed in a non-rectangular shape (e.g., a trapezoid). For example, the pressure applying surface 61b may be non-parallel to an opposing surface 63b. Additionally, the shaft 52 does not include a flange. Rather, the shaft 52 may be shaped in a manner similar to two frusto-conical members that form a central apex 53. Thus, the shaft 52 need not be cylindrical in shape and need not include a flange.

Figure 6:
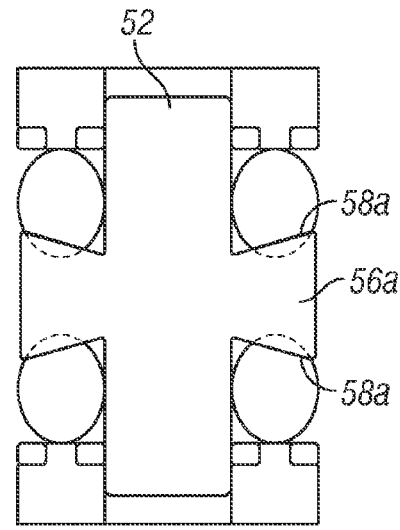

In FIG. 6, the shaft 52 includes a flange 56a having a generally trapezoidal shape. The flange 56a includes non-parallel pressure applying surface 58a. In this embodiment, the shaft 52 does not include back-up rings seated on the flange 56a.

Figure 7:
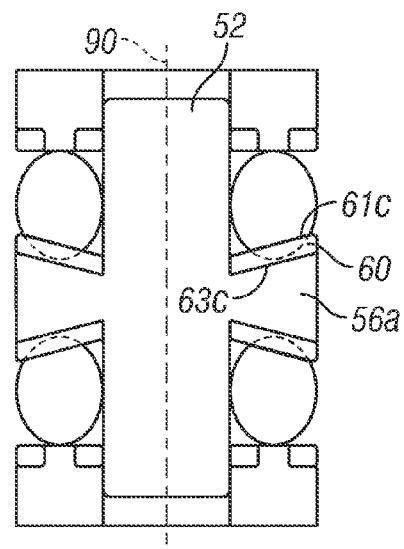

In FIG. 7, the shaft 52 includes a flange 56a having a generally trapezoidal shape. A back-up 60 that seats on the flange 56a may be formed as a parallelogram. The back-up ring 60 may include a pressure applying surface 61c that is not orthogonal relative to the longitudinal axis 90 of the shaft 52.

Figure 8:
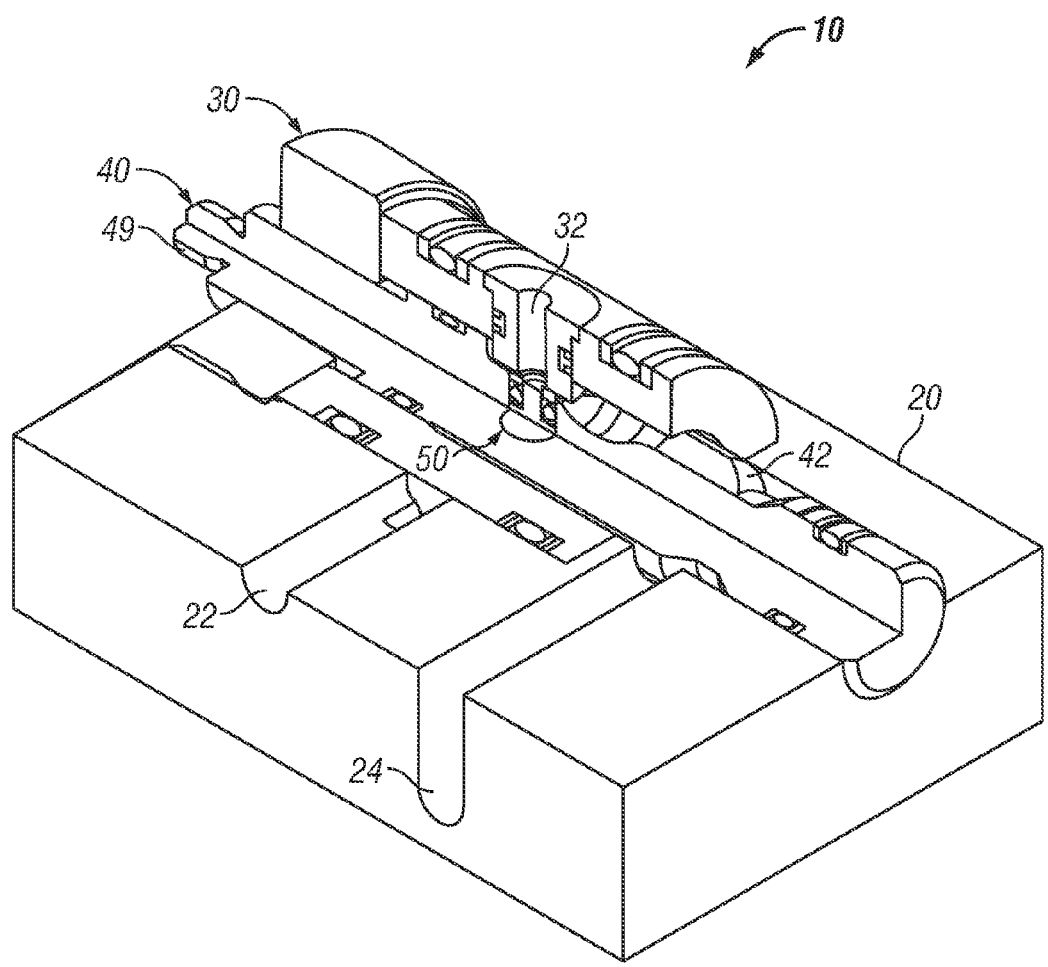
FIG. 8 shows an isometric cut-away of the FIG. 1 embodiment.

Referring now to FIG. 8, there is isometrically shown the valve 10. As discussed previously, the valve 10 includes a housing 20 that receives the cage 30, the rod, and the disk member 50. In the embodiment shown, the flow bore 32 connects to flow conduit 22 and the flow passages 42 connect to flow conduit 24. The translation of the rod 40 shifts the disk member 50 between in the open and closed position as described earlier. A variety of mechanisms may be used to move the rod 40. In some embodiments, pressurized hydraulic fluid may be applied the rod 40. In other embodiments, an electro-mechanical device coupled to an end 49 of the rod 40 may be used to reciprocate the rod 40 in the housing 20. Illustrative devices include electric motors, hydraulically-actuated motors, solenoid-type devices, etc.

Figure 9:
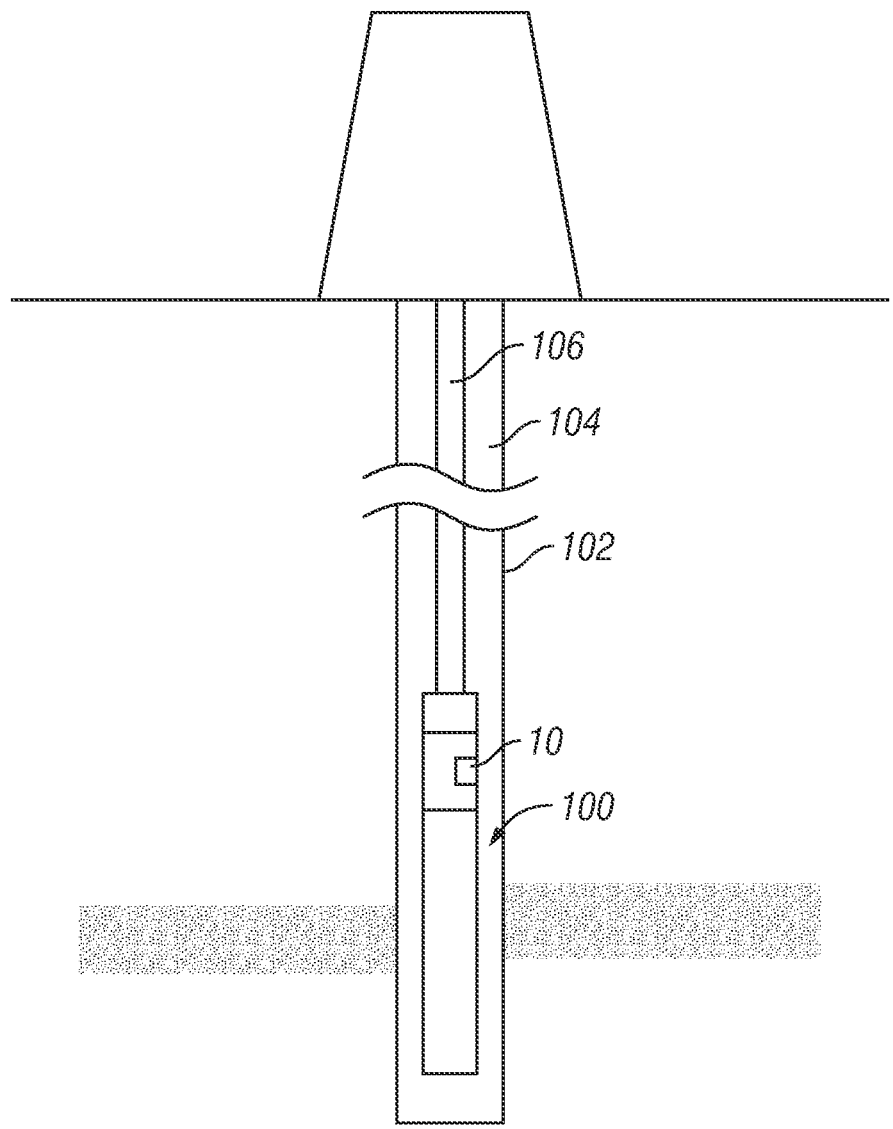
FIG. 9 schematically shows well system that uses a valve according to one embodiment of the present disclosure in a borehole formed in an earthen formation.

Referring to FIG. 9, in one non-limiting embodiment, the valve 10 may be used to create or diffuse a differential pressure between a subsurface environment and an environment in a well tool 100 that has been closed off from the subsurface environment. The subsurface environment may be a borehole 102 that is filled with well fluids. The well tool 100 may be a bottomhole drilling assembly, a fluid sampling tool, a coring tool, or any other tool that is configured or perform one or more tasks (e.g., forming the borehole, sampling/testing formation solids or fluids, etc.) in the borehole 102. In some applications, this may be considered an equalizer-type valve. The valve 10 may be used to isolate or connect an annulus 104 of the borehole with a flowline (not shown) of the valve internal to the well tool 100. The well tool 100 may be conveyed via a work string 106, which may include a rigid carrier (e.g., drill string, casing, liner, etc.) or non-rigid carrier (e.g., wireline, slickline, eline, etc.). When the annulus is isolated from the internal flowline, a significant pressure drop is created on the order of thousands of psi's. If the default position of the valve is to connect the annulus with the internal flowline, then the valve is considered normally open. If the default position is isolation, then the valve is considered normally closed. Disk members or assemblies according to embodiments of the present disclosure enhance internal sealing and, therefore, increase the operating capabilities of the valve 10. In certain embodiments, the valve 10 may be bidirectional and multi-switchable. Moreover, in certain embodiments, in closed position the valve may be zero leakage.

From the above, it should be appreciated that what has been described includes, in part, an apparatus for controlling a fluid flow. The apparatus may include a body in which a fluid conduit is formed and a disk member that selectively blocks flow across the fluid conduit. The disk member may include a shaft having a longitudinal axis, a ring member disposed on the shaft, a sealing member disposed on the shaft, and a pressure applying surface in contact with the sealing member. The pressure applying surface may be non-orthogonal to the longitudinal axis.

From the above, it should be appreciated that what has been described also includes, in part, a method for controlling a fluid flow. The method may include moving a disk member to selectively block flow across a fluid conduit formed in a body. The disk member may include a shaft having a longitudinal axis, a ring member disposed on the shaft, a sealing member disposed on the shaft, and a pressure applying surface in contact with the sealing member. The pressure applying surface may be non-orthogonal to the longitudinal axis.

From the above, it should be appreciated that what has been described further includes, in part, an apparatus for controlling a fluid flow. The apparatus may include a body having a fluid conduit formed of a first section and a second section; a rod configured to translate in the body, the rod having a flow passage in communication with the first fluid conduit section; a first and second sleeve members disposed in the body, each sleeve member having a bore in communication with the second fluid conduit section; and a disk member disposed in the rod and between the first and second sleeve members. The disk member may include a shaft having a longitudinal axis and a medial flange; a sealing member disposed on the shaft and on each side of the medial flange; a pressure applying surface in contact with each sealing member, wherein the pressure applying surfaces are non-orthogonal to the longitudinal axis; and a ring member disposed on each end of the shaft, each sealing member being positioned between an associated ring member and pressure applying surface.

While the foregoing disclosure is directed to the one mode embodiments of the disclosure, various modifications will be apparent to those skilled in the art. It is intended that all variations be embraced by the foregoing disclosure.

We claim:

1. An apparatus for controlling a fluid flow, the apparatus comprising:
    a body having a fluid conduit, a first flow line in fluid communication with the fluid conduit, and a second flow line;
    a rod configured to translate in the body, the rod having a flow passage in fluid communication with the second flow line and selective communication with the fluid conduit, wherein the rod has an end positioned outside of the body;
    a first and second sleeve members disposed in the body, each sleeve member having a bore in communication with the fluid conduit;
    a disk member selectively blocking flow across the fluid conduit, wherein the disk member is disposed in the rod and between the first and second sleeve members, and wherein the disk member includes:
        a shaft having a longitudinal axis;
        a sealing member disposed on the shaft;
        a flange formed on the shaft;
        a first ring member in contact with the flange, the first ring member having a pressure applying surface in contact with the sealing member, wherein the pressure applying surface is non-orthogonal to the longitudinal axis; and
        a second ring member disposed on the shaft, the sealing member being positioned between the second ring member and the pressure applying surface; and
    an actuator operably coupled to the disk member using the rod.

2. The apparatus of claim 1 wherein the first ring member has a cross-sectional shape that is selected from a group consisting of: (i) a parallelogram; (ii) rhomboid, and (iii) trapezoidal.

3. The apparatus of claim 1 wherein the flange has a cross-sectional shape that is selected from a group consisting of: (i) a parallelogram; (ii) rhomboid, and (iii) trapezoidal.

4. The apparatus of claim 1 wherein the disk member includes a surface, at least a portion of which includes: (i) polycrystalline diamond, (ii) monocrystalline diamond, (iii) carbide, (iv) cemented carbide, (v) tungsten carbide, (vi) a hardened metal, (vii) a synthetic material, (viii) a plastic material, and (ix) monocrystalline aluminum oxide.

5. The apparatus of claim 1 further comprising the sleeve member that engages the sealing member at a contact surface formed at least partially of: (i) polycrystalline diamond, (ii) monocrystalline diamond, (iii) carbide, (iv) cemented carbide, (v) tungsten carbide, (vi) a hardened metal, (vii) a synthetic material, (viii) a plastic material, and (ix) monocrystalline aluminum oxide.

6. The apparatus of claim 1 further comprising an actuator operably coupled to the disk member.

7. The apparatus of claim 6, wherein the actuator is electrically energized.

8. The apparatus of claim 1, wherein the second ring member includes at least one groove, and further comprising at least one backup ring disposed in the at least one groove.

9. An apparatus for controlling a fluid flow, the apparatus comprising:
    a body having a fluid conduit, a first flow line in fluid communication with the fluid conduit, and a second flow line;
    a rod configured to translate in the body, the rod having a flow passage in fluid communication with the second flow line and selective communication with the fluid conduit;
    a first and second sleeve members disposed in the body, each sleeve member having a bore in communication with the fluid conduit;
    a cage disposed in the body, the first and second sleeve members being positioned in the cage;
    a retention member securing the cage in the body; and
    a disk member disposed in the rod and between the first and second sleeve members, wherein the disk member includes:
        a shaft having a longitudinal axis and a medial flange;
        a sealing member disposed on the shaft and on each side of the medial flange;
        a first ring member in contact with each side of the medial flange, each first ring member having a pressure applying surface in contact with the adjacent sealing member, wherein the pressure applying surfaces are non-orthogonal to the longitudinal axis; and
        a second ring member disposed on each end of the shaft, each sealing member being positioned between an associated second ring member and an associated pressure applying surface.

10. The apparatus according to claim 9, further comprising a well tool configured to be disposed in a borehole, wherein the conduit is positioned in the well tool.

11. The apparatus according to claim 9, further comprising a carrier configured to convey the well tool into the borehole.

12. The apparatus of claim 9, wherein the rod has an end positioned outside of the body.

13. A method for controlling a fluid flow between a first fluid line and a second fluid line formed in a body, wherein the body includes a fluid conduit in communication with the first fluid line, the fluid conduit having a first section and a second section, and wherein a first and a second sleeve member are positioned in a cage that is secured in the body with a retention member, each sleeve member having a bore in communication with the fluid conduit, the method comprising:

moving a disk member into a position between the first section and the second section to block flow between the second fluid line and the first fluid line, wherein the disk member includes:
        a shaft having a longitudinal axis;
        a sealing member disposed on the shaft;
        a pressure applying surface in contact with the sealing member, wherein the pressure applying surface is non-orthogonal to the longitudinal axis; and
        a ring member disposed on the shaft, the sealing member being positioned between the ring member and the pressure applying surface; and flowing fluid from the second fluid line to the first fluid line by moving the disk member out of the position between the first section and the second section.

14. The method of claim 13 wherein the disk member includes a surface, at least a portion of which includes: (i) polycrystalline diamond, (ii) monocrystalline diamond, (iii) carbide, (iv) cemented carbide, (v) tungsten carbide, (vi) a hardened metal, (vii) a synthetic material, (viii) a plastic material, and (ix) monocrystalline aluminum oxide.

15. The method of claim 13 further comprising the sleeve member engages the member at a contact surface formed at least partially of: (i) polycrystalline diamond, (ii) monocrystalline diamond, (iii) carbide, (iv) cemented carbide, (v) tungsten carbide, (vi) a hardened metal, (vii) a synthetic material, (viii) a plastic material, and (ix) monocrystalline aluminum oxide.

16. The method of claim 13, further comprising controlling a flow of fluid between an environment in a well tool and an annulus of a borehole using the fluid conduit.

17. The method according to claim 13, further comprising conveying the well tool into a borehole using a carrier.

* * * * *